(12) United States Patent
Takatoshi

(10) Patent No.: US 8,627,217 B2
(45) Date of Patent: Jan. 7, 2014

(54) WINDOW DISPLAY SYSTEM, WINDOW DISPLAY METHOD, PROGRAM DEVELOPMENT SUPPORT DEVICE, AND SERVER DEVICE

(76) Inventor: Yanase Takatoshi, Hyogo (JP)

( * ) Notice: Subject to any disclaimer, the term of this patent is extended or adjusted under 35 U.S.C. 154(b) by 1386 days.

(21) Appl. No.: 11/579,446

(22) PCT Filed: Apr. 15, 2005

(86) PCT No.: PCT/JP2005/007307
§ 371 (c)(1),
(2), (4) Date: Nov. 2, 2006

(87) PCT Pub. No.: WO2005/109176
PCT Pub. Date: Nov. 17, 2005

(65) Prior Publication Data
US 2008/0126955 A1    May 29, 2008

(30) Foreign Application Priority Data

| May 6, 2004 | (JP) | ................................ 2004-166397 |
| May 6, 2004 | (JP) | ................................ 2004-166398 |
| Jul. 30, 2004 | (JP) | ................................ 2004-224368 |
| Sep. 8, 2004 | (JP) | ................................ 2004-260692 |
| Nov. 1, 2004 | (JP) | ................................ 2004-317425 |

(51) Int. Cl.
*G06F 3/00* (2006.01)
(52) U.S. Cl.
USPC ........... 715/762; 715/763; 715/764; 715/765; 715/778; 715/782; 715/783; 715/804
(58) Field of Classification Search
USPC ......... 715/781–784, 764–769, 762, 763, 804, 715/778
See application file for complete search history.

(56) References Cited

U.S. PATENT DOCUMENTS 5,390,295 A * 2/1995 Bates et al. .................... 715/789
5,714,971 A * 2/1998 Shalit et al. .................... 715/804
(Continued)

FOREIGN PATENT DOCUMENTS

CN    1325056    12/2001
EP    0 657 799    6/1995
(Continued)

OTHER PUBLICATIONS

James Henriksen; Windows-based Animation With Proof; 1998; IEEE; pp. 241-247.*

(Continued)

*Primary Examiner* — Linh K Pham
(74) *Attorney, Agent, or Firm* — Wenderoth, Lind & Ponack, L.L.P.

(57) ABSTRACT

Provided is a window display system and the like, in which plural window structures are switched to be displayed on a single window. An event processing program is associated with a first window structure, and this first window structure is assigned to a basic window. By executing an event processing program, a second window structure is assigned to the basic window. By changing or updating the basic window, or by assigning the second window structure to the basic window, a drawing window is drawn. On the single drawing window, the first and second window structures and are switched to be displayed. The drawing of the drawing window is caused by window size change, window movement, change of overlapping window position, window visualization, invalidation of window drawing area, or window color change.

12 Claims, 19 Drawing Sheets

(56) References Cited

U.S. PATENT DOCUMENTS

| | | | |
|---|---|---|---|
| 5,920,315 A * | 7/1999 | Santos-Gomez | 715/792 |
| 6,681,368 B1 * | 1/2004 | Kawabata | 715/234 |
| 7,010,755 B2 * | 3/2006 | Anderson et al. | 715/778 |
| 7,068,266 B1 * | 6/2006 | Ruelle | 345/418 |
| 7,123,945 B2 * | 10/2006 | Kokubo | 455/566 |
| 8,082,517 B2 * | 12/2011 | Ben-Shachar et al. | 715/781 |
| 8,276,095 B2 * | 9/2012 | Cutler et al. | 715/804 |
| 2001/0043235 A1 | 11/2001 | Best et al. | |
| 2002/0054137 A1 * | 5/2002 | Dvorak | 345/804 |
| 2002/0171682 A1 * | 11/2002 | Frank et al. | 345/790 |
| 2003/0058286 A1 * | 3/2003 | Dando | 345/853 |
| 2005/0010876 A1 * | 1/2005 | Robertson et al. | 715/782 |
| 2005/0149879 A1 * | 7/2005 | Jobs et al. | 715/796 |
| 2005/0188329 A1 * | 8/2005 | Cutler et al. | 715/804 |
| 2008/0126955 A1 * | 5/2008 | Takatoshi | 715/762 |
| 2010/0182506 A1 * | 7/2010 | Bae et al. | 348/564 |
| 2011/0271226 A1 * | 11/2011 | Janssen et al. | 715/794 |
| 2012/0304112 A1 * | 11/2012 | Cutler et al. | 715/788 |

FOREIGN PATENT DOCUMENTS

| | | | |
|---|---|---|---|
| JP | 07-200222 | 8/1995 | |
| JP | 2001-034250 | 2/2001 | |
| JP | 2003-186593 | 7/2003 | |
| JP | 2003186593 A * | 7/2003 | G06F 3/00 |

OTHER PUBLICATIONS

Voth et al.; Distributed Application Development for Three-Tier Architecture: Microsoft on Window DNA; 1998; IEEE; pp. 41-45.*

Scott Kronick, translated by Shiki Okasaka, Netscape Hand Book Nihongo Yaku, Kabushiki Kaisha Sofutowea Japan, Edition: Aug. 1, 1995, pp. 15-19.

How to Use Internal Frames, (http://java.sun.com/docs/books/tutorial/uiswing/components/internalframe.html) [downloaded Sep. 12, 2006] (published Oct. 2001).

How to Use Tabbed Panes, (http://java.sun.com/docs/books/tutorial/uiswing/components/tabbedpane.html) [downloaded Oct. 4, 2006] (published Oct. 2001).

IT: Insider's Computer Dictionary [MDI] (http://www.atmarkit.cojp/icd/root/72/5787072.html), and About the Multiple Docment Interface (http://windowssdk.msdn.microsoft.com/en-usilibrary/ms644908.aspx) which corresponds to IT: Insider's Computer Dictionary [MDI} downloaded Oct. 4, 2006] (last update May 29, 2003).

How to Use Internal Frames, (http://java.sun.com/docs/books/tutorial/uiswing/components/internalframe.html) [downloaded Sep. 12, 2006].

How to Use Tabbed Panes, (http://java.sun.com/docs/books/tutorial/uiswing/components/tabbedpane.html) [downloaded Oct. 4, 2006].

IT: Insider's Computer Dictionary [MDI] (http://www.atmarkit.co.jp/icd/root/72/5787072.html), and About the Multiple Docment Interface (http://windowssdk.msdn.microsoft.com/en-us/library/ms644908.aspx) which corresponds to IT: Insider's Computer Dictionary [MDI} [downloaded Oct. 4, 2006].

European Search Report issued May 25, 2010 in European Application No. 05730578.1.

(Japanese) Flash 4.0a Read Me, Last Update: Jan. 20, 2000 15: 10 (Printed out on Apr. 2, 2007), (English) Adobe-Tech Note: Flash 4.0a Release Macintosh Only-Read Me, Url: http://www.adobe.com/cfusion/knowledgebase/index.cfm?id=tn__14241 Last Update: Apr. 18, 2000 (downloaded on Apr. 2, 2007).

* cited by examiner

FIG. 8

```
1    import java. awt. *:
2    import java. awt. event. *:
3    import javax. swing. *:
4
5    public class FSemple extends JFrame {
6
7            private JLabel lb:
8            private JList lst:
9            private JScrollPane sp:
10           private Container cnt:
11           private JPanel jp:
12
13  //************************************************
14  //start program from here
15  //************************************************
16           public static void main (String arges[])
17           {
18                   FSample fs = new FSample():
19           }
20
21  //    ************************************************
22  //    display first window "window0"
23  //    ************************************************
24           public FSample()
25           {
26                   //set a title
27                   super ("window switching"):
28                   cnt =getContentPane():
29                   jp = new JPanel():
30                   setSize(600, 400):
31                   this. addWindowListener(new SampleWindowListener()):
32  //               display window "window0"
33                   window0():
34           }
35
36  //    ************************************************
37  //    display window "window0"
38  //    ************************************************
39           private void window0()
40           {
41  //               delete window structure
42                   cnt. removeAll():
43  //               create window structure
44                   W0 w0 = new W0(getSize(). jp):
45  //               assign window structure
46                   cnt. add(jp):
47  //               register event processing program
48                   w0. bt. addActionListener(new Aw1()):
49  //               draw window
50                   setVisible(true):
51           }
```

FIG. 9

```
52  //      ****************************************************
53  //      display window "window1"
54  //      ****************************************************
55
56          private void window1()
57          {
58  //              delete window structure
59                  cnt. removeAll():
60  //              create window structure
61                  W1 w1 = new W1(getSize(). jp):
62  //              assign window structure
63                  cnt. add(jp):
64  //              register event processing program
65                  w1. bt. addActionListener(new Aw0()):
66  // draw window
67                  setVisible(true):
68          }
69
70  //      ****************************************************
71  //      event processing program for terminating program
72  //      ****************************************************
73
74          class SampleWindowListener extends WindowAdapter
75          {
76                  public void windowClosing(WindowEvent e)
77                  {
78                          System exit(0):
79                  }
80          }
81
82  //      ****************************************************
83  //      event processing program for displaying window1
84  //      ****************************************************
85          class Aw1  implements ActionListner
86          {
87                  public void actionPerformed(ActionEvent e)
88                  {
89                          window1 ():
90                  }
91          }
```

FIG. 10

```
92   //    ****************************************************
93   //    event processing program for displaying window0
94   //    ****************************************************
95         class Aw0  implements ActionListner
96         {
97                 public void actionPerformed(ActionEvent e)
98                 {
99                         window0 ():
100                }
101        }
102
103   }
104
105   //    ****************************************************
106   //    define window structure of window0
107   //    ****************************************************
108   import java. awt. *:
109   import javax. swing. *:
110
111   public class W0 {
112                protected  JButton bt:
113
114                protected  W0( Dimension dm.  JPanel jp)
115                {
116                        JLabel lb:
117                        JList lst:
118                        JScrolPane sp:
119
120   //               create window structure
121                   jp. removeAll():
122                   jp. setLayout(new GridLayout(3.1)):
123                   String str[] = {"a", "b", "c",
124                                                   "d", "e", "f",
125                                                   "g", "h", "i",
126                                                   "j", "k", "l"}:
127
128                   lb = new JLabel("window0"):
129                   lst = new JList(str):
130                   sp = new JScrollPane(lst):
131                   bt = new JButton("button for switching to window1"):
132
133                   jp. add(lb):
134                   jp. add(sp):
135                   jp. add(bt):
136                }
137
138   }
```

FIG. 11

```
139   //      ****************************************************
140   //      define window structure of window1
141   //      ****************************************************
142   import java. awt. :
143   import javax. swing. :
144
145   public class W1 {
146           protected  JButton bt:
147
148           protected  W1( Dimension dm.  JPanel jp)
149           {
150                   JLabel lb:
151                   JList lst:
152                   JScrolPane sp:
153
154   //            create window structure
155               jp. removeAll():
156               jp. setLayout(new GridLayout(1.3)):
157               String str[] = {"あ", "い", "う",
158                                              "え", "お", "か",
159                                              "き", "く", "け",
160                                              "こ", "さ", "し"}:
161
162               lb = new JLabel("window1"):
163               lst = new JList(str):
164               sp = new JScrollPane(lst):
165               bt = new JButton("button for switching to window0")
166
167               jp. add(sp):
168               jp. add(bt):
169               jp. add(lb):
170
171          }
172
173   }
```

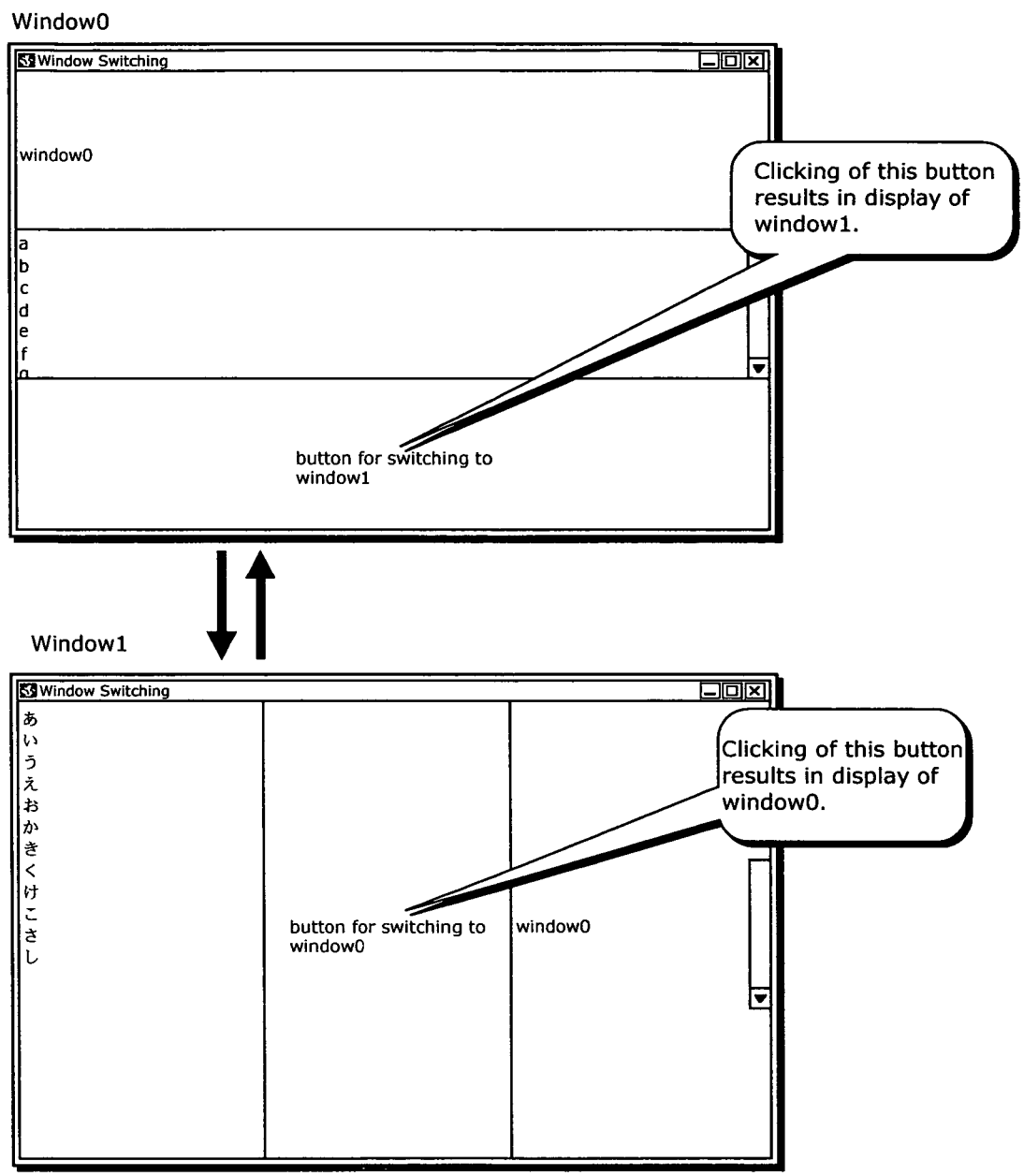

FIG. 13

```
1   import java. awt. *:
2   import javax. swing. *:
3
4   public class FSemple2 extends JFrame {
5
6           private JLabel lb:
7           private JList lst:
8           private JScrollPane sp:
9           private Container cnt:
10          private JPanel jp:
11
12  //************************************************
13  //start program from here
14  //************************************************
15          public static void main (String arges[])
16          {
17                  FSample2 fs = new FSample2():
18          }
19
20  //      ************************************************
21  //      display first window "window0"
22  //      ************************************************
23          public FSample()
24          {
25                  //set a title
26                  super ("window switching"):
27                  cnt =getContentPane():
28                  setSize(600, 400):
29                  window0():
30          }
31
32  //      ************************************************
33  //      display window "window0"
34  //      ************************************************
35          private void window0()
36          {
37                  W0 w0 = new W0(getSize(). this. cnt):
38          }
39
40  }
```

FIG. 14

```
41   // ****************************************************
42   // define window structure of window0 and event processing
43   // ****************************************************
44   import java. awt. *:
45   import java. awt. event. *:
46   import javax. swing. *:
47
48   //
49   public class W0 {
50           protected  JButton bt:
51           protected JFrame jf:
52           protected Container cnt:
53
54           W0( Dimension dm.  JFrame pjf.  Container pent )
55           {
56                   jf = pjf:
57                   cnt = pent:
58                   JLabel lb:
59                   JList lst:
60                   JScrolPane sp:
61
62                   pjf.setSize(dm):
63   //              delete window structure
64                   cnt. removeAll():
65   //              create window structure
66                   cnt. setLayout(new BorderLayout()):
67                   String str[] = {"a", "b", "c",
68                                                   "d", "e", "f",
69                                                   "g", "h", "i",
70                                                   "j", "k", "l"}:
71                   lb = new JLabel("window0"):
72                   lst = new JList(str):
73                   sp = new JScrollPane(lst):
74                   JButton bt = new JButton("button for switching to window1"):
75                   bt. addActionListener(new Aw1()):
76   //              assign window structure
77                   cnt. add(lb. BorderLayout. NORTH):
78                   cnt. add(lb. BorderLayout. CENTER):
79                   cnt. add(lb. BorderLayout. SOUTH):
80   //              display window
81                   jf.setVisible(true):
82           }
```

FIG. 15

```
83
84    //    ***************************************************
85    //    event processing program for displaying window1
86    //    ***************************************************
87          class Aw1  implements ActionListner
88          {
89                public void actionPerformed(ActionEvent e)
90                {
91                      W1 w1 = new W1(jf. getSize(). jf.  cnt):
92                }
93          }
94
95    }
```

FIG. 16

```
96  // ****************************************************
97  // define window structure of window1 and event processing
98  // ****************************************************
99  import java. awt.   :*
100 import java. awt. event.   :*
101 import javax. swing.   :*
102
103 // public class W1 extends JFrame {
104 public class W1  {
105         protected  JButton bt:
106         protected JFrame jf:
107         protected Container cnt:
108
109         W1( Dimension dm.  JFrame pjf.  Container pent )
110         {
111                 jf = pjf:
112                 cnt = pent:
113                 JLabel lb:
114                 JList lst:
115                 JScrolPane sp:
116
117                 pjf.setSize(dm):
118 //              delete window structure
119                 cnt. removeAll():
120 //              create window structure
121                 cnt. setLayout(new GridLayout(1, 3)):
122                 String str[] = {  "あ","い","う",
123                                                   "え", "お", "か",
124                                                   "き", "く", "け",
125                                                   "こ", "さ", "し"}:
126
127                 lb = new JLabel("window1"):
128                 lst = new JList(str):
129                 sp = new JScrollPane(lst):
130                 JButton bt = new JButton("button for switching to window0"):
131                 bt. addActionListener(new Aw0()):
132 //              assign window structure
133                 cnt. add(sp):
134                 cnt. add(bt):
135                 cnt. add(lb):
136 // display window
137                 jf.setVisible(true):
138
139         }
```

FIG. 17

```
140
141   //    ****************************************************
142   //    event processing program for displaying window1
143   //    ****************************************************
144         class Aw0  implements ActionListner
145         {
146              public void actionPerformed(ActionEvent e)
147              {
148                   W0 w0 = new W0(jf. getSize().  jf.  cnt):
149              }
150         }
151   }
152
```

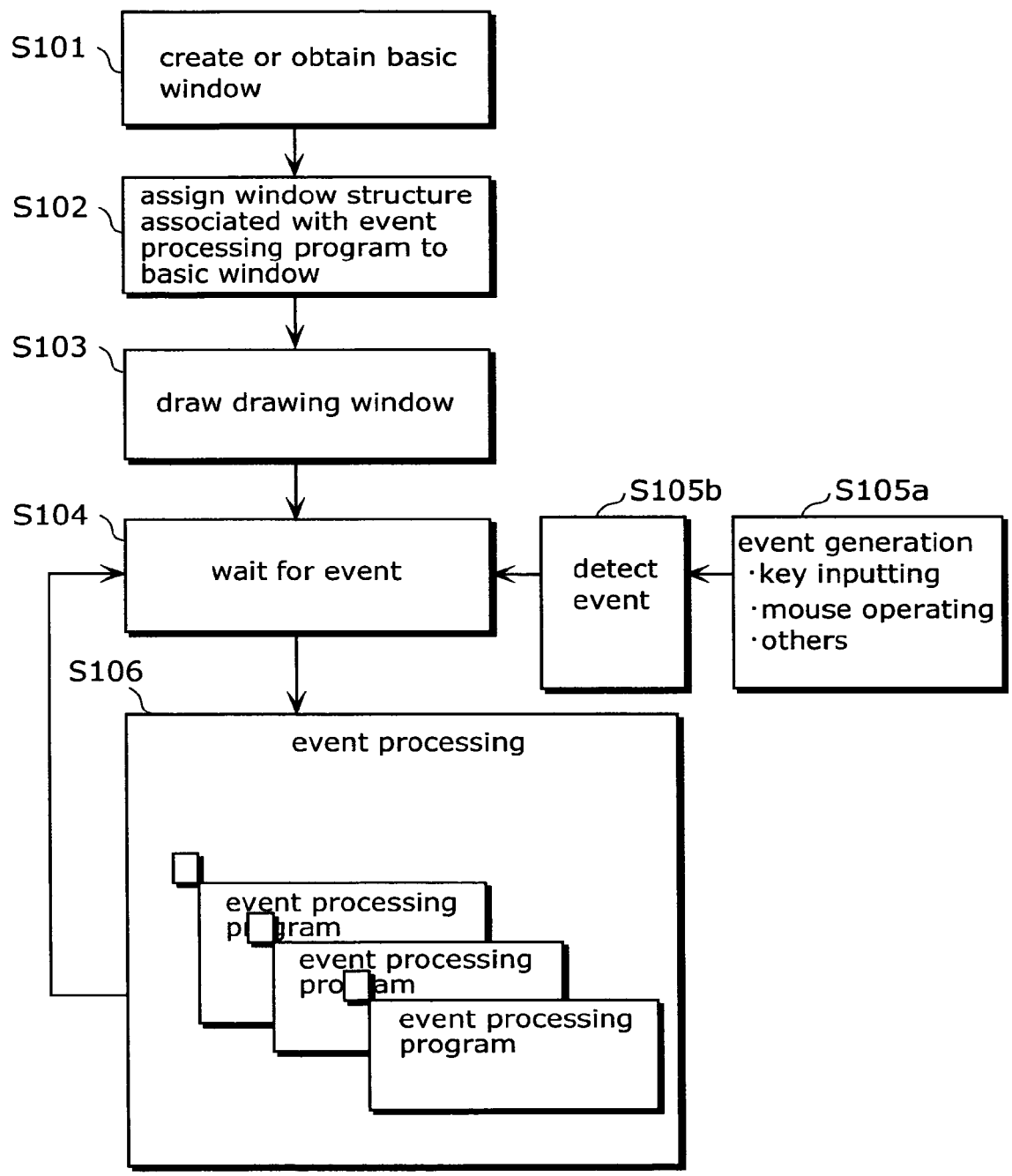
FIG. 18- PRIOR ART

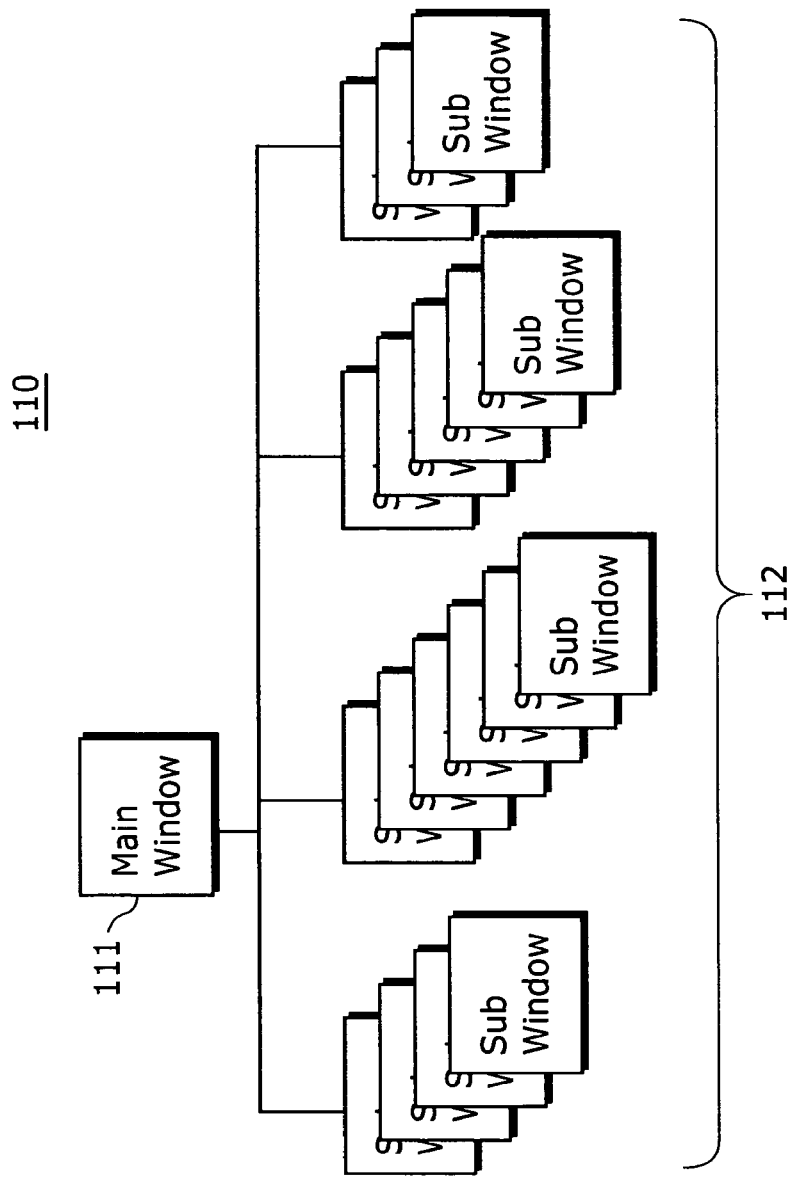
FIG. 19 - PRIOR ART

WINDOW DISPLAY SYSTEM, WINDOW DISPLAY METHOD, PROGRAM DEVELOPMENT SUPPORT DEVICE, AND SERVER DEVICE

TECHNICAL FIELD

The present invention relates to a window display system for displaying windows on a display, and more particularly to a window display system for displaying a window under the control of a window management unit which manages multiple windows.

BACKGROUND ART

FIG. 18 is a flowchart of a window display system using a conventional method. In the conventional system, firstly a window is created or obtained (S101), and a structure of the window associated with an event processing program is assigned to the created window (S102). Next, the window is drawn on a display (S103), and finally the window waits for occurrence of events (S104). Then, when an event, such as key inputting or mouse operation, occurs (S105a), the event is detected by a window management unit (S105b), and the event processing program is executed (S106). When the event processing program completes the executing, the window merely waits again for events.

Note that the "structure of a window (window structure)" is a set of display elements (data) to be displayed on the window. The expression of "assigning a window structure to a window" means associating the window structure with the window to be drawn. The "drawing a window" means displaying the window together with the window structure which is associated with the window on a display.

As far as such a processing method of the window display system is used, a new different window needs to be display in order to display a different window structure on the window. Therefore, in a general multi-window display system 110 as shown in FIG. 19, not only a main window 111 but also plural sub-windows 112 are opened, and these windows are displayed by overlapping one another or switching among them.

However, a window consumes a large amount of system resources, such as a memory. Therefore, a system having a large number of windows consumes more system resources, which is inefficient.

On the other hand, a single-window display system, such as JAVA™ APPLET, displays a window in a browser. However, APPLET displays only a single window, but cannot display various windows by switching them.

Furthermore, as disclosed, for example, Japanese Patent Application Laid-Open No. 2003-186593, a method of switching display contents in plural windows has been known.

However, this conventional reference discloses that a window is drawn by switching plural windows, but window structures are not able to be switched to be displayed within a single window.

DISCLOSURE OF INVENTION

Problems that Invention is to Solve

In view of the conventional situation, the first object of the present invention is to provide a window display system and the like capable of switching plural window structures to be displayed within a single window.

Here, even if the above first object is achieved, it is further desirable to provide a window display system capable of parallel development using plural development personnel in order to shorten a time required for the development. For example, in program development in the above window display system and the like, it is desirable that production is performed separately by plural classes or modules (hereinafter, referred to as "classes or the like").

In view of the above, the second object of the present invention is to make it possible to perform the program development separately by plural development personnel in the above window display system and the like.

The third object of the present invention is to enable a window itself to generate events easily in the above window display system and the like.

Means to Solve the Problems

In order to achieve the first object, the first characteristics of the window display system according to the present invention are as follows: an event processing program is associated with the first window structure; this first window structure is assigned to a basic window; the second window structure is assigned to the basic window by execution of the event processing program; a drawing window is drawn by changing or updating the basic window or by assigning the second window structure to the basic window; and the first and second window structures are switched to be displayed on the single drawing window.

According to the above characteristics, the event processing program is associated with the first window structure, and this first window structure is assigned to the basic window. Here, the second window structure is assigned to the basic window, by, for example, executing the event processing program caused by clicking of a button or the like in the first window structure. A drawing window is drawn by changing or updating the basic window or by assigning the second window structure to the basic window. Thereby, it is possible to switch the first and second window structures to be displayed on the single drawing window.

According to the above characteristics, the drawing of the drawing window is caused by, for example, window size change, window movement, change of overlapping window position, window visualization, invalidation of window drawing area, or window color change.

In order to achieve the second object, the second characteristics of the window display system according to the present invention are as follows: when in the above first characteristics, a class or a module (hereinafter, referred to as "class or the like") having a pointer to a target to which a window structure is assigned or the target itself (hereinafter, referred to as "pointer or the like") different from a class or the like for creating or changing the window structure (hereinafter, referred to as "creation or the like", or simply "creation"), the pointer or the like is provided to the class or the like performing the creation of the like of the window structure, so that the created window structure is assigned to the provided pointer or the like, when the class or the like is switched from the created window structure to other window structure.

In order to achieve the third object, the further characteristics of the window display system according to the present invention are as follows: states of various kinds of windows are registered as predetermined window states; a state of a target window is obtained as an obtained window state; one state is selected from the predetermined window states as a selected window state, and the selected window state is compared to the obtained window state; when the selected window state is the same as the obtained window state, a different state is selected from the predetermined window states to be a new state for the target window; and when the selected window state is different from the obtained window state, the selected window state is set as a new state for the target window.

Note that each of the above-described characteristics is provided not only as the window display system, but also as the following: a window display method; a computer program and a recording medium in which the computer program is recorded; a server having a providing means for providing the window display system; a program development support device which creates a computer program or a window; and the created program and a recording medium in which the program is recorded.

Effects of the Invention

Thus, according to the first characteristics of the above present invention, the drawing window is drawn by executing the event processing program. As a result, it is possible to provide the following: a window display system; a window display method; a computer program and a recording medium in which the computer program is recorded; and a server having a providing means for providing the window display system, all of which are capable of displaying the first window structure and the second window structure on the single drawing window by switching these window structures.

Therefore, in a system capable of displaying multiple windows, it is possible to develop a window display system having less windows and consuming less system resources, such as a memory, as compared to the conventional systems.

Further, when the present invention is applied to the environment where only a single window can be displayed, a multiple-window display system for the single window can be constructed. For example, when the present invention is applied to JAVA™ APPLET, which operates in a browser of the Internet, a multiple-window display system can be constructed within the browser, so that a multiple-window display system having high security of JAVA™ APPLET can be easily constructed.

That is, by using the first characteristics of the present invention, it is possible to develop a window display system with less windows and to operate the window display system with less memory. Further, if the system uses a virtual memory, it is expected that the virtual memory is used less, and an operating speed of the system is increased.

Still further, even if the present invention is applied to apparatuses having small-capacity memory or apparatuses not having a hard disk and therefore not using virtual memory, such as a portable telephone or a portable information apparatus, it is possible to construct a window display system with less memory consumption, thereby realizing a window display system having various additional functions which have not been expected conventionally.

Still further, when the present invention is applied to household appliances, such as a television set, a refrigerator, or an air conditioner, in which a computer is embedded to connect these household appliances via a network, it is possible to provide a human interface having less memory and high operability.

In JAVA™ APPLET, which operates in a browser of the Internet, only one display area is given in a display area of the browser. Therefore, JAVA™ APPLET has a difficulty in developing the mufti-window display system. However, JAVA™ APPLET has a number of advantageous characteristics; JAVA™ APPLET can construct a high-security system, in which reading and writing from/to a terminal where the JAVA™ APPLET itself operates are severely restricted, IP addresses of communication partners are limited, and so on. Further, JAVA™ APPLET can automatically download programs at start-up, so that software distribution is not necessary when programs are changed. Furthermore, JAVA™ APPLET can operate in any operating systems if a browser and a JAVA™ runtime environment work, which makes it easy to manage a operation environment of a terminal. Despite the above advantageous characteristics, JAVA™ APPLET has hardly been implemented in serious systems because of the difficulty in developing the mufti-window display system. However, when the present invention is applied to JAVA™ APPLET, it becomes possible to develop a serious window display system with high security and a less operation cost.

Moreover, according to the second characteristics of the present invention, in the above window display system and the like, it is possible to put the event processing program, the window structure creation unit, and the associating unit in the same class or the like by transferring a pointer or the like among these units. As a result, as a general mufti-window environment can develop plural windows separately the window display system and the like of the present invention can also develop plural window structures separately, and perform program development separately by plural development personnel.

That is, according to the second characteristics of the present invention, it is possible to execute the above window display system and the like by separating the system and the like into plural classes or the like. This makes it easier to develop and maintain the window display system and, also, to develop the window display system using the plural development personnel. As a result, the window display system can be applied to serious system development.

Furthermore, according to the third characteristics of the present invention, in the above window display system, the window states can be easily changed, and as a result, it is possible to generate events.

That is, according to the third characteristics of the present invention, in the above window display system and the like, events can be generated easily by changing the states of windows. Thus, although most of computer programmers and system engineers are not familiar with a detail controlling structure of the window display system, it is possible to develop a window display system capable of easily displaying plural window structures on a single window by switching these window structures, without negatively affecting the overall control of the window display system.

BRIEF DESCRIPTION OF DRAWINGS

FIG. 8 is a (first) list of the first sample program.

FIG. 9 is another (second) list of the first sample program.

FIG. 10 is still another (third) list of the first sample program.

FIG. 11 is still another (fourth) list of the first sample program.

FIG. 12 is a diagram showing an example of window displaying, where the first sample program is executed.

FIG. 13 is a (first) list of the second sample program.

FIG. 14 is another (second) list of the second sample program.

FIG. 15 is still another (third) list of the second sample program.

FIG. 16 is still another (fourth) list of the second sample program.

FIG. 17 is still another (fifth) list of the second sample program.

FIG. 18 is a flowchart of processing performed by the conventional window display system.

FIG. 19 is a diagram showing an example of a window configuration of the conventional window display system.

| Numerical References | |
|---|---|
| 11, 11A, 11B, 11C, 11A1, 11B1, 12 | event processing program registered for a window |
| 11A2, 11B2 | program calling a program for assigning a window structure |
| 11A3 | program for assigning a window structure |
| 13 | window drawn on a display |
| 14 | window having basic display elements |
| 14a | drop-down menu |
| 15 | window structure of window 0 |
| 16 | window structure of window 1 |
| 15a, 16b | a button or the like in association with event processing program |
| 19a, 19b | pointer or the like |
| 21 | first menu structure |
| 22 | second menu structure |
| 31 | class or the like having a pointer or the like |
| 32 | class or the like creating a window structure |
| 50 | window display system |
| 51 | basic window creation unit |
| 52 | first window structure creation unit |
| 53 | second window structure creation unit |
| 54 | associating unit |
| 55 | storage unit |
| 55a | basic window |
| 55b | first window structure |
| 55c | second window structure |
| 56 | drawing unit |
| 57 | drawing-event generation unit |
| 60 | display unit |
| 70 | window management unit |

BEST MODE FOR CARRYING OUT THE INVENTION

The following describes a preferred embodiment of the present invention with reference to the drawings.

Firstly, functions of the window display system according to the present invention are described.

Figure 1:
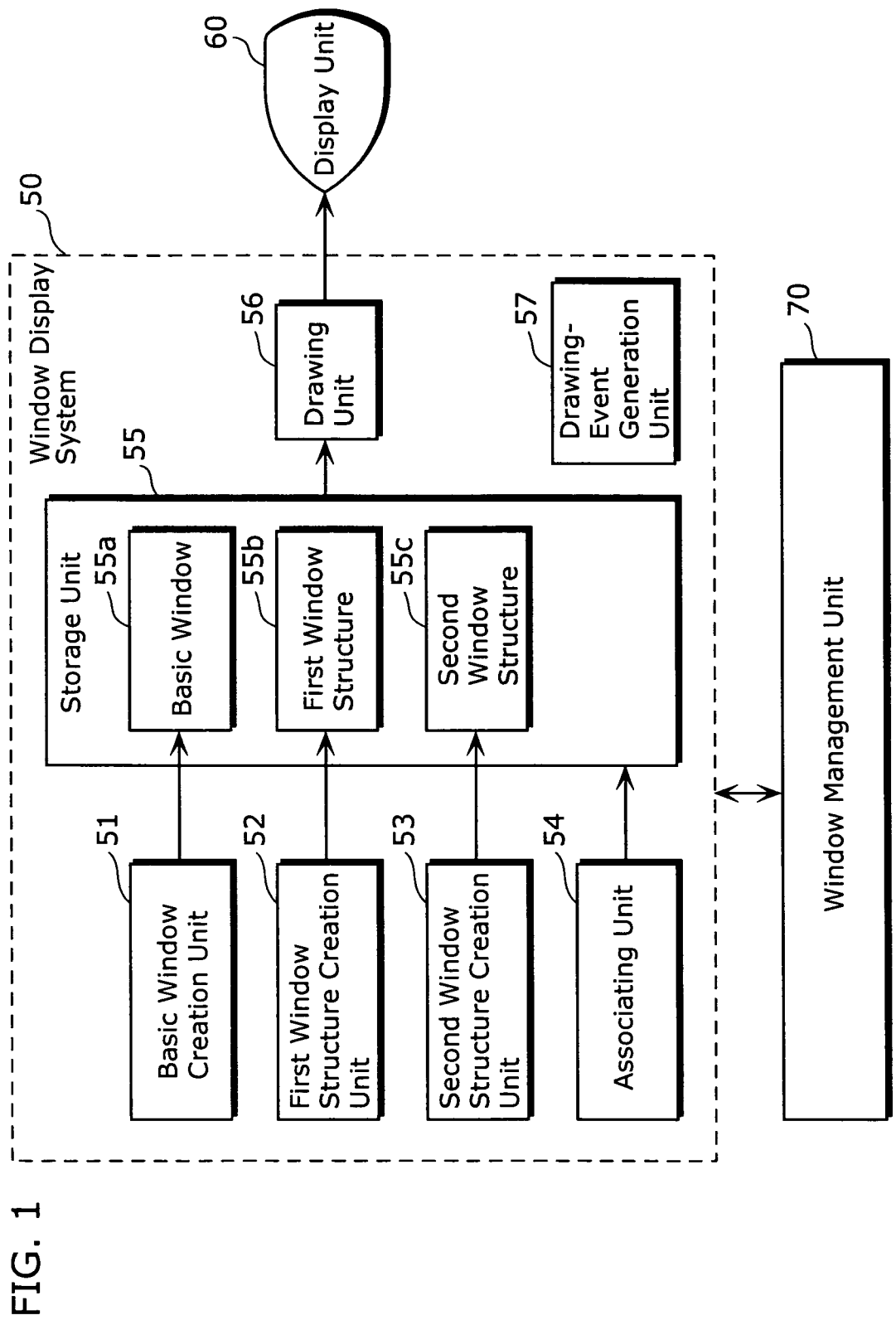
FIG. 1 is a functional block diagram showing a structure of a window display system according to the present invention.

FIG. 1 is a functional block diagram showing a structure of a window display system 50 according to the present invention. Besides the window display system 50, here displayed are: a display unit 60 for displaying windows, such as a Liquid Crystal Display (LCD); and a window management unit 70 for managing multiple windows.

This window display system 50 is a window display system which displays windows on the display unit 60 under the management of the window management unit 70. This window display system 50 includes: a basic window creation unit 51 which creates or obtains, in a storage unit 55, a single basic window 55a as a frame to be displayed; the first window creation unit 52 which creates, in the storage unit 55, the first window structure 55b that is a set of display elements (data) and is to be displayed together with the basic window 55a; the second window creation unit 53 which creates, in the storage unit 55, the second window structure 55c that is another set of display elements and is to be displayed together with the basic window 55a; an associating unit 54 which associates, with the basic window 55a, one of the first window structure 55b and the second window structure 55c created by the first window creation unit 52 and the second window creation unit 53, respectively; a drawing unit 56 which draws on the display unit 60 the basic window, and the first window structure 55b or the second window structure 55c that is associated with the basic window 55a by the associating unit 54; a storage unit 55 which includes a memory and the like for holding the basic window 55a, the first window structure 55b, the second window structure 55c, and the like; and a drawing-event generation unit 57 which generates an event that becomes a trigger of starting the drawing unit 56.

Here, when the window management unit 70 detects a predetermined event, the associating unit 54 switches a window structure to be associated with the basic window 55a, from the first window structure 55b to the second window structure 55c, or from the second window structure 55c to the first window structure 55b. Then, the drawing unit 56 draws the basic window 55a, and also the first window structure 55b or the second window structure 55c which is newly associated with the basic window 55a by the associating unit 54.

Here, when the associated window structure is to be switched from the first window structure 55b to the second window structure 55c, it is preferable that the associating unit 54 deletes the first window structure 55b in the storage unit 55 and the second window structure creation unit 53 creates a new second window structure 55c. On the other hand, when the associated window structure is to be switched from the second window structure 55c to the first window structure 55b, the associating unit 54 deletes the second window structure 55c in the storage unit 55 and the first window structure creation unit 52 creates a new first window structure 55b.

Figure 2A:
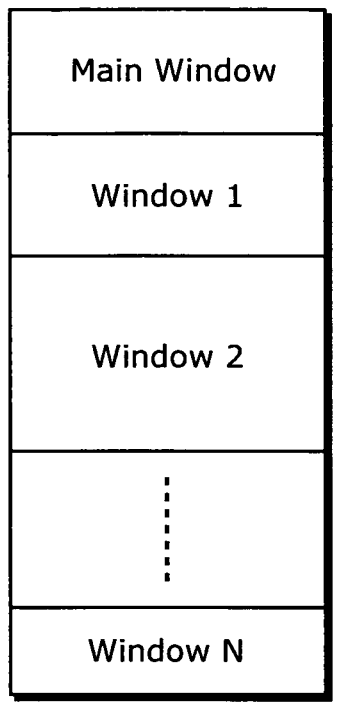
FIGS. 2A to 2D are diagrams for explaining changes in a storage unit in the window display system.
Figure 2B:
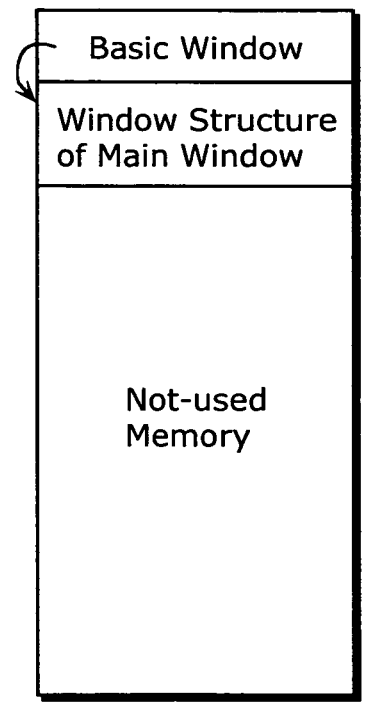
Figure 2C:
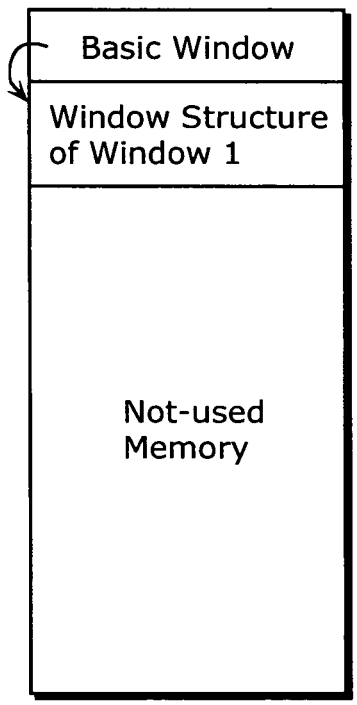
Figure 2D:
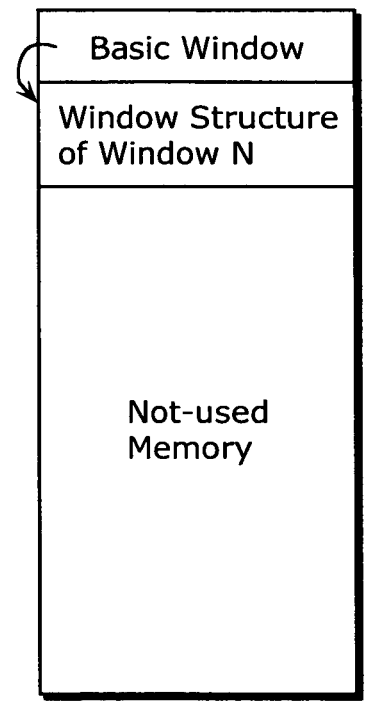

FIGS. 2A to 2D are diagrams for explaining the changes in the storage unit 55 of the window display system 50. In a general mufti-window display system, as shown in FIG. 2A, the storage unit 55 holds respective window structures associated with all windows opened on a display (main window, and windows 1 to N). On the other hand, in the window display system 50 according to the present embodiment, as shown in FIG. 2B, when a main window is displayed, the storage unit 55 holds only the basic window and a window structure of the main window. Here, if another window 1 started by the main window is opened, as shown in FIG. 2C, the storage unit 55 holds only the basic window and a window structure of the window 1. Further, if still another window N (where N=2, in the present embodiment) started by the window 1 is opened, as shown in FIG. 2D, the storage unit 55 holds only the basic window and a window structure of the window N.

Thus, as obvious from comparing of FIG. 2A with FIGS. 2B to 2D, in the present embodiment, plural window structures are switched to be displayed, but a storage size occupying the storage 55 is smaller than the general mufti-window display system. That is, the present embodiment realizes a mufti-window display system which operates even with a small-sized memory.

Note that examples of the event generated by the drawing-event generation unit 57 are events for executing window size change, window movement, change of overlapping window position, window visualization, invalidation of window drawing area, window color change, and the like.

Note also that, in order to switch the association between the basic window and the window structures by the associating unit 54, the following technique is also possible. Each of the first window creation unit 52 and the second window structure creation unit 53 obtains and holds a pointer to a target window with which the first window structure 55b or the second window structure 55c is associated or the target window itself ("pointer or the like"). Then, the first window structure 55b and the second window structure 55c are created to be associated with the obtained held pointer or the like, respectively.

Moreover, the drawing-event generation unit 57 performs as follows. The drawing-event generation unit 57 stores states of various kinds of windows, as predetermined window states and a state of a target window that is the basic window 55a drawn by the drawing unit 56, as an obtained window state. Here, one state is selected from the predetermined window states as a selected window state, and the selected window state is compared to the obtained window state. If the selected window state is the same as the obtained window state, another state is selected from the predetermined window states, to be set as a new state of the target window. On the other hand, if the selected window state is different from the obtained window state, the selected window state is set as a new state of the target window. By setting the new state of the target window, the target window 55a generates an event. This makes the drawing unit 56 display the basic window 55a together with the first window structure 55b or the second window structure 55c. Note that examples of the predetermined window states are states of various kinds of windows having different window sizes. Thereby, by registering, as the predetermined windows, various kinds of windows whose sizes have differences that are too small to be perceived by a human being (for example, a size less than a few pixels), for example, it is possible to generate events and switch the windows, without recognizable change in appearance of the windows.

The following describes specific structures and operations of the window display system according to the present invention, in a case where the window display system is realized as software (program executed inside an information device, such as a computer, and data).

Figure 3:
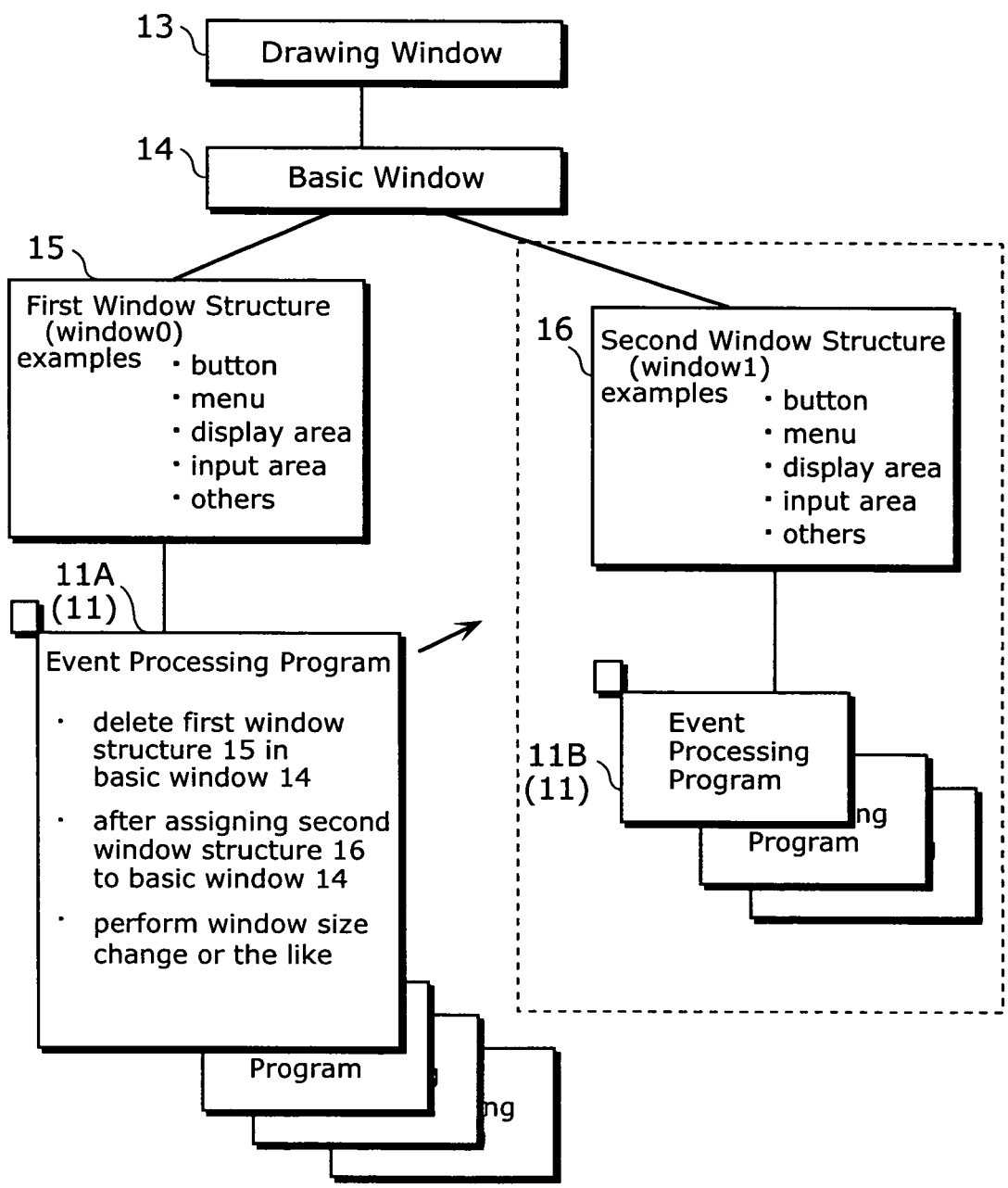
FIG. 3 is a diagram showing a software configuration of the window display system.
Figure 4:
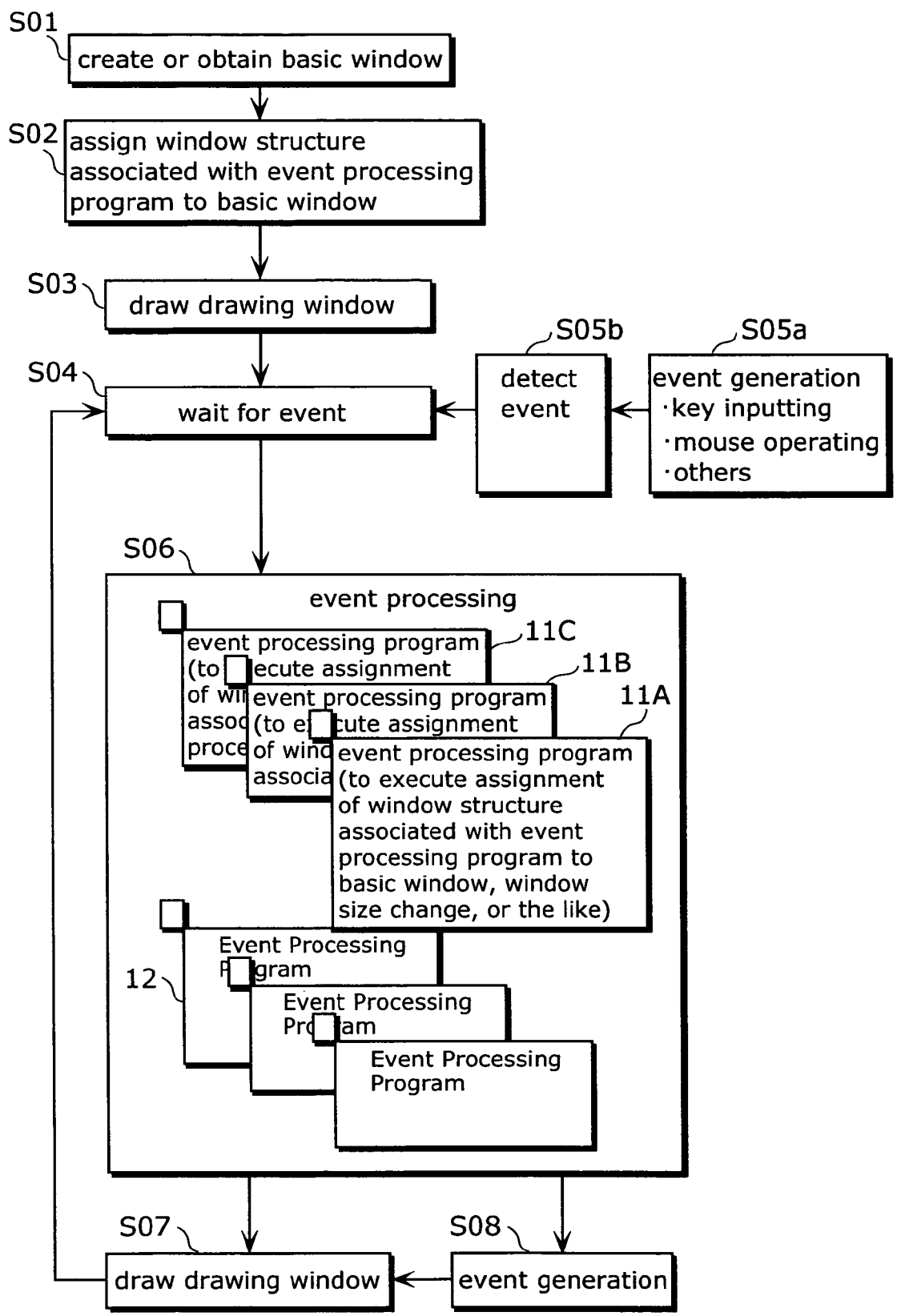
FIG. 4 is a flowchart of processing performed by the window display system shown in FIG. 3.

FIG. 3 is a diagram showing a structure of a window display system that is one embodiment of the window display system, the window display method, the computer program, and the recording medium in which the computer program is recorded (hereinafter, referred to as a "window display system and the like"), according to the present invention. FIG. 4 is a flowchart of processing performed by the window display system of FIG. 3. The following describes the processing of the present invention with reference to these figures.

As shown in FIG. 3, with a basic window 14 which is recorded on a main memory and then created or obtained (hereinafter, expressed also as simply "created"), a drawing window 13 is drawn on a display by recording the drawing window 13 onto a graphic memory. Here, the expression of "creation (created)" means newly creating a window, and the expression of "obtainment (obtained)" means, for example, obtaining a drawing area in a previously created window by, for example, JAVA™ APPLET. When a window is firstly drawn, the drawing window 13 is a window having a window structure 15 of a window0 which is associated with an event processing program 11A. The event processing program 11A is a program for assigning a window structure 16 of a window1 which is associated with an event processing program 11B, to the created basic window 14.

Note that FIG. 3 shows a main software configuration of the window display system according to the present invention, and corresponds to the functional block diagram of FIG. 1 as follows. The drawing window 13 of FIG. 3 is image data which is temporarily held in the drawing unit 56 of FIG. 1 and displayed on the display unit 60. The basic window 14, the first window structure 15, and the second window structure 16 of FIG. 3 correspond to the basic window 55a, the first window structure 55b, and the second window structure 55c of FIG. 1, respectively. The event processing program 11A of FIG. 3 includes the second window structure creation unit 53, the associating unit 54, and the drawing-event generation unit 57 of FIG. 1. Likewise, the event processing program 11B of FIG. 3 includes the first window structure creation unit 52, the associating unit 54, and the drawing-event generation unit 57 of FIG. 1. Note that FIG. 3 does not show the basic window creation unit 51, the drawing unit 56, the display unit 60, nor the window management unit 70 of FIG. 1.

As shown in FIG. 4, to the created basic window 14 (S01), the first window structure 15 associated with the event processing program 11A is assigned (S02). A reference numeral 12 represents a general event processing program. Then, the basic window 14 to which the first window structure 15 is assigned is drawn on a display (S03), and the basic window 14 waits until an event is generated (S04).

When an event is generated (S05a), the event is detected by the window management unit 70 (S05b), and the event processing programs 11A and 12 associated with the event are executed (S06). Note that the window management unit 70 manages a displayed position and a size of each window, overlapping positions between windows, and the like, and determines to which window an event, such as key inputting or mouse clicking, is to be provided, for example.

For example, when an event is generated by mouse clicking or the like (S05) and the event processing program 11A is executed (S06), firstly, the window structure 15 of the window0 is deleted from the basic window 14. Next, the window structure 16 associated with the event processing program 11B is assigned to the basic window 14. Here, if a part or all of the information and the like held in the window structure 15 of the window0 is stored, the part or all of the information of the window can be reproduced using the stored information, when the window 15 of the window0 is displayed again.

The window size change or the like of the event processing program 11A causes drawing of a window. For example, based on the window size change or the like, the drawing window 13, which the window structure associated with the event processing program is assigned to, is drawn (S07), and then the processing proceeds to Step S4 for event waiting. Although it has been described that the window size change or the like directly causes drawing of the drawing window (S07), it is also possible, depending on a structure of the system, that the window size change or the like causes generation of an event (S08), and according to the event, the drawing window is drawn (S07).

When the window size change or the like is executed, the drawing window 13 is replaced to the newly changed basic window 14. As described above, by repeating Steps S04 to S07 (S08), every time each of new event processing programs 11A, 11B, 11C, 11D . . . is executed, a current window structure is deleted and a new window structure associated with the event processing program is assigned. Thereby, various kinds of window structures 15, 16, and the like are switched to be displayed in the drawing window 13. Note that it has been described that the drawing window is indirectly drawn resulting from the window size change or the like, but it is also possible to draw the drawing window by executing a command to directly draw the drawing window, or by generating another event by which the window is directly drawn.

The window drawing is caused by window size change (including size maximization and size minimization in this description), window movement, change of overlapping window position, window visualization, invalidation of window drawing area, or color change of the window display system.

Here, in JAVA™ APPLET programs, a drawing event of the event processing program is caused by resize(SmallWSize[1][1], SmallWSize[1][2]) for change of a window size:

Further, in C-language programs of Windows™, drawing of the event processing program is caused by
MoveWindow(hWndBUTTON2, 20, 20, 50, 100, TRUE)
for window movement;
SetWindowPos(hWndMain,
HWND-TOP,300,10,600,500,SWP-SHOWWINDOW)
for change of overlapping window position;
ShowWindow(hWndBUTTON1,GnCmdShow)
for visualization of a window;
InvalidateRect(hWndMain, NULL, TRUE)
for invalidation of a drawing area in a window; and
SetSysColors(0,COLOR-BACKGROUND,0)
for color change for a window.

Note that the above instructions are merely examples, and the commands are not limited to the above.

Figure 5:
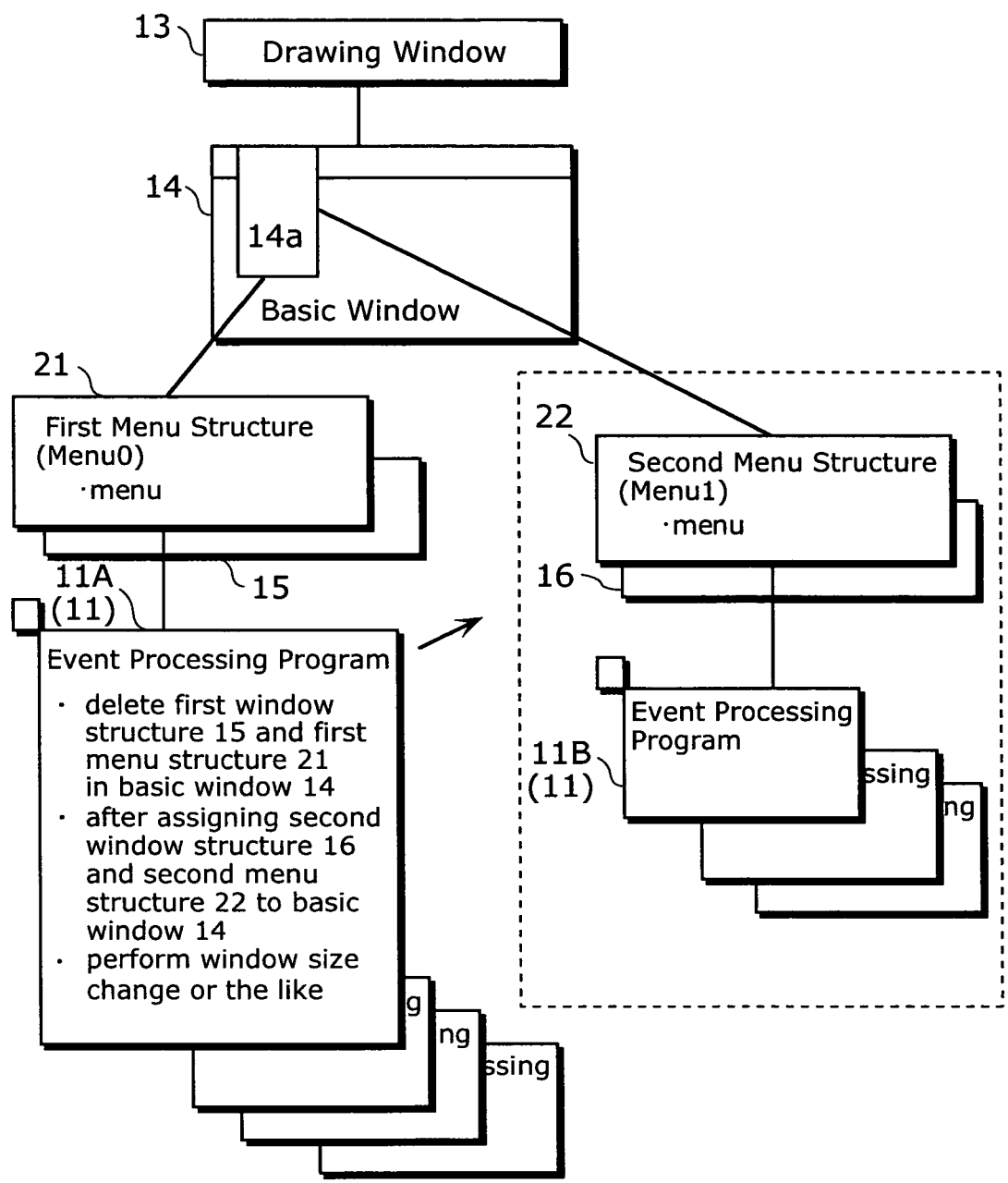
FIG. 5 is a diagram showing an example of a modification of software configuration of the window display system shown in FIG.

In an example of modification of the present invention as shown in FIG. 5, the first menu structure 21 and the second menu structure 22 are used in addition to the first and second window structures. These first and second menu structures 21 and 22 are associated with a standard menu, such as a drop-down menu 14a or the like in the basic window 14. Therefore, by executing a menu in the first menu structure 21, an event processing program 11A associated with the menu is operated, so that, in the same manner as described previously, the first and second window structures 15 and 16, and the first and second menu structures 21 and 22 are displayed on the drawing window 13.

Figure 6:
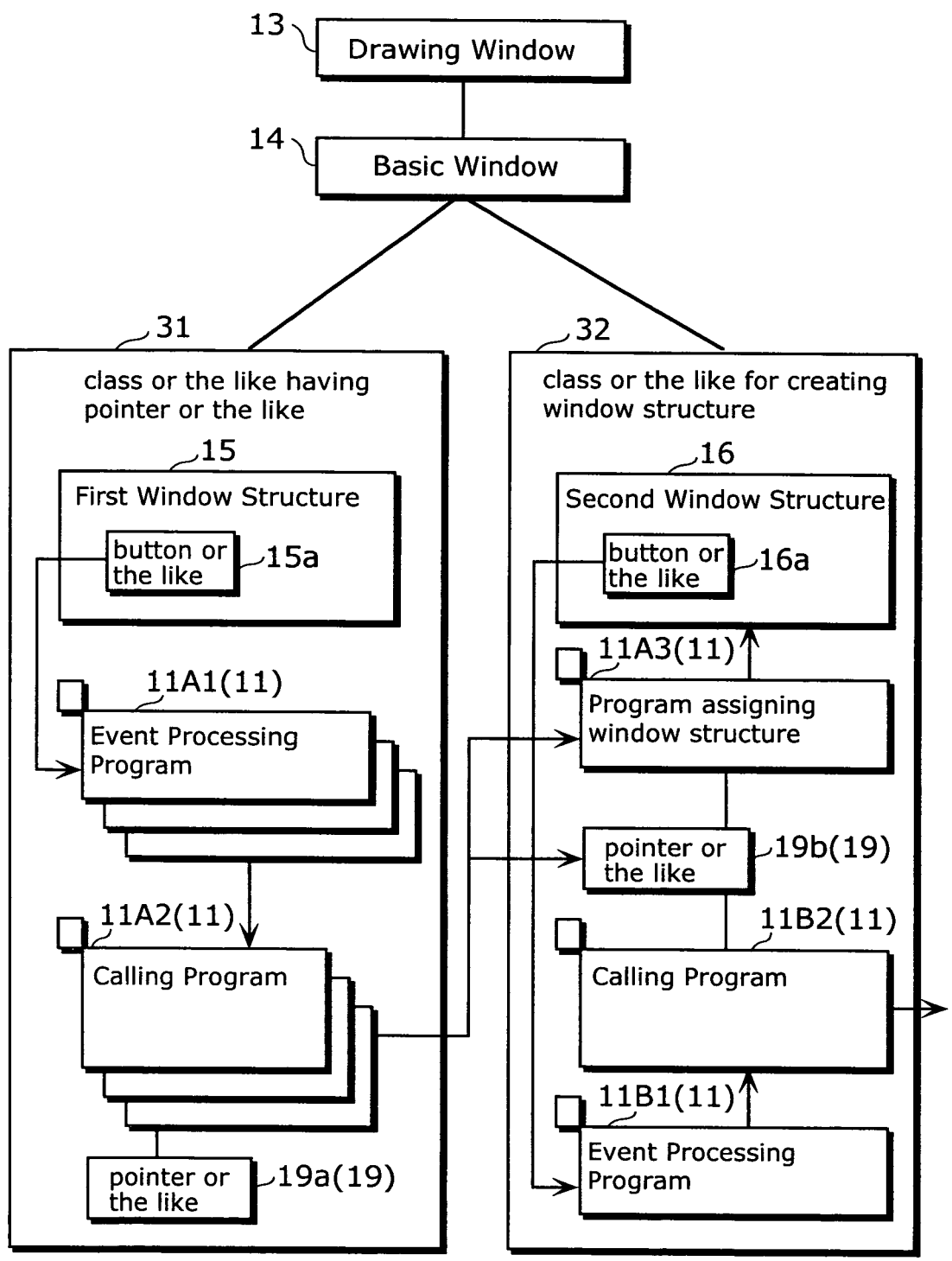
FIG. 6 is a block diagram of a detail structure of the window display system shown in FIG. 3.

FIG. 6 is a block diagram showing one embodiment of the present invention, and shows association among a window structure including buttons and the like, event processing programs, calling programs, and a pointer to a target to which the window structure is assigned or the target itself (hereinafter, referred to as "pointer or the like").

When a button or the like 15a in the first window structure 15 is clicked, an event processing program 11A1 is executed. When the event processing program 11A1 is executed, the calling program 11A2 is executed. The calling program 11A2 provides a pointer or the like 19a to a class or the like 32 for creating a window structure, and executes a program 11A3 for assigning the window structure to the target. The program 11A3 for assigning the window structure assigns the second window structure associated with the event processing program to the basic window 14. Note that the expression of "creating a window structure" means, not only newly creating a window structure, but also creating a window structure by changing the existing window structure. In this case, the "switching association" performed by the associating unit 54 also means switching association which results in that the association is the same before and after the switching.

Figure 7:
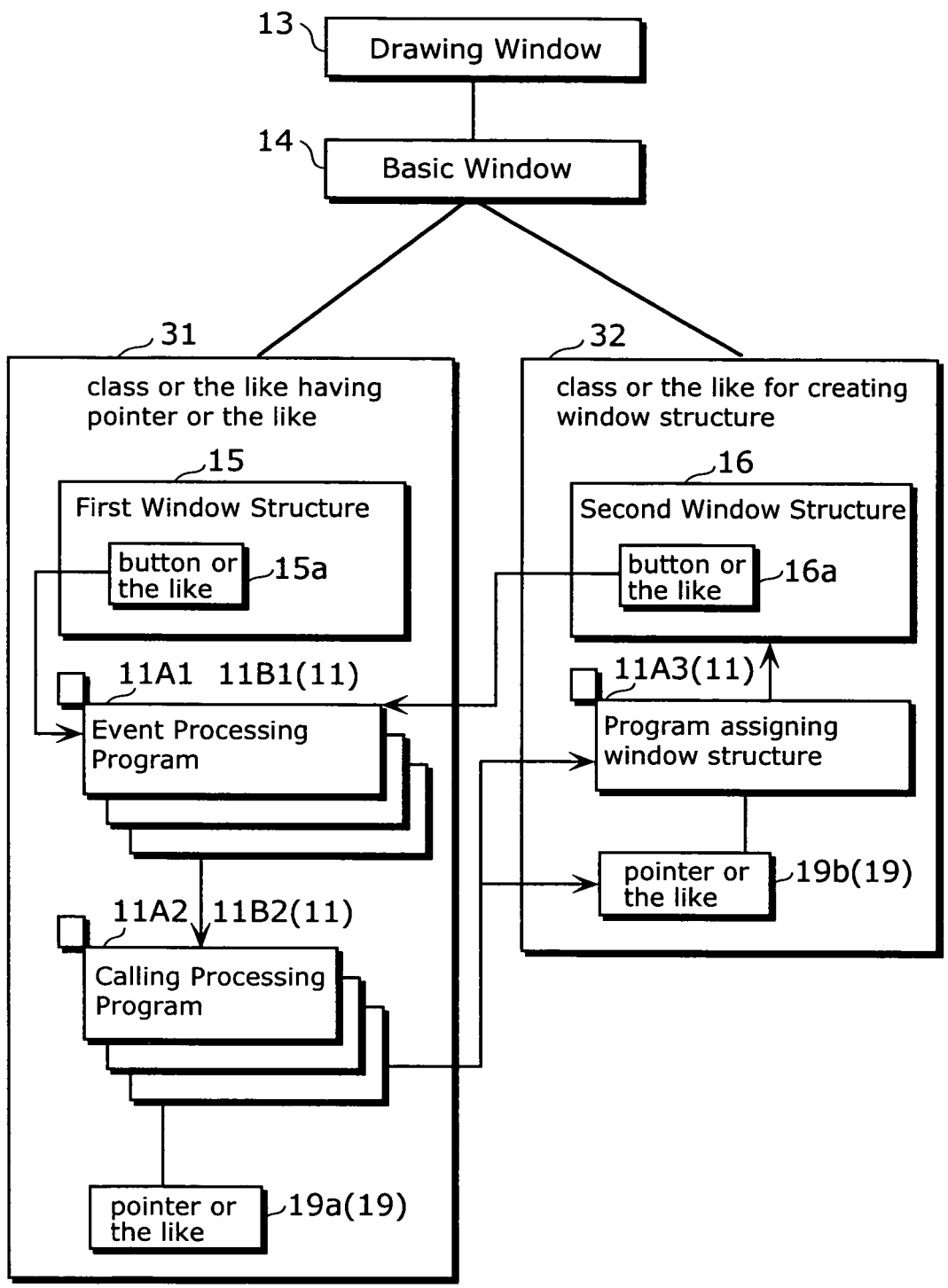
FIG. 7 is a block diagram showing an example of a modification of the structure shown in FIG. 6.

FIG. 7 is a block diagram showing an example of modification of the structure shown in FIG. 6. FIG. 7 differs from FIG. 6 in that the event processing program 11B1 and the calling processing program 11B2 belong to the class or the like 31 which has the pointer or the like.

Note that the first window structure 15 may be outside the class or the like 31 having the pointer or the like. Note also that the calling program 11A2 or 11B2 can be deleted, and the processing of the calling program 11A2 or 11B2 can be performed by the event processing program 11A1 or 11B1.

One of the objects of the present invention is to provide a window display system capable of having a window itself generate an event for drawing a window. Changing setting of a window state is effective to generate the event. Here, a system, in which the change of setting of a window state can be performed easily, is described. That is, a function of the drawing-event generation unit 57 in FIG. 1 is explained in detail. Table 1 is one example of data structure of the predetermined window states. The window states are indicated as window sizes as one example, but may be indicated as other types of window states.

TABLE 1

|  | vertical | horizontal |
|---|---|---|
| window size 1 | 600 | 800 |
| window size 2 | 601 | 800 |

A current window size is obtained, a value of the window size 1 or a value of the window size 2 is selected, and the current window size is compared to the selected value. If the current window size is different from the selected value, then the selected value is set as a new window size so that the window state is changed. If the current window size is the same as the selected value, then the not-selected value is set as a new window size so that the new window state is set for the target window. This triggers generation of an event. Note that if a window state is changed to be used but later needs to be returned to the original window state, for example in a case of an overlapping window position or the like, the used window state is changed again to the original window state, after the first changing. Note also that if the window state is the overlapping window position, a dummy window is previously created, and a current window always needs to be hidden under the dummy window.

When setting of a window size is changed by user's operation or the like, it is also possible to perform the window size comparison and the window state change, after changing the window sizes 1 and 2 (predetermined window states). Respective differences between a current window size and the window sizes 1 and 2 are calculated, and a difference whose absolute value is smaller is set to as a setting difference. If the current window size is larger than the window sizes 1 and 2, then respective values are obtained by adding the window sizes 1 and 2 with an absolute value of the setting difference, respectively, and the obtained values are set as new predetermined window states. If the current window size is smaller than the window sizes 1 and 2, then respective values are obtained by subtracting the window sizes 1 and 2 with an absolute value of the setting difference, and the obtained values are set as new predetermined window states, thereby changing the predetermined window sates. Next, in the same manner as described above, a setting window state of the target window is changed by setting, as a new window size, a window size which is different from a current window size. This triggers generation of an event.

Table 2 is a block diagram showing an example of modification of the table 1. The table 2 differs from the table 1 in that there are plural types of windows, and for each of the window types, there are plural window sizes. Predetermined window states can be set depending on a type of a window, for example, by setting large window sizes for a money depositing window, and small window sizes for a money disbursement window.

TABLE 2

|  |  | horizontal | vertical |
|---|---|---|---|
| Money Depositing Window | window size 1 | 800 | 600 |
|  | window size 2 | 801 | 600 |
| Money Disbursement Window | window size 3 | 400 | 300 |
|  | window size 4 | 401 | 300 |

Table 3 is a table in which the example of the table 2 is added with other window states, such as a color of the window. It is possible to switch other plural window states such as the window color, depending on the various types of windows.

TABLE 3

|  |  | horizontal | vertical | BG color | font color |
|---|---|---|---|---|---|
| money Depositing Window | window size 1 | 800 | 600 | pale blue | black |
|  | window size 2 | 801 | 600 |  |  |
| Money Disbursement Window | window size 3 | 400 | 300 | pale green | blue |
|  | window size 4 | 401 | 300 |  |  |

Next, the embodiment is described where the window display system of the present invention is realized as a JAVA™ programs.

FIGS. 8 to 11 are lists of the program. Here, shown are lists of the first sample program which are described in JAVA™ and display two window structures by switching them.

In FIG. 8, lines 16 to 19, a main program "main( )" is described.

In FIG. 8, lines 24 to 34, a program "FSample( )" which is called by the main program "main( )" is described. This program "FSample( )" is for creating a basic window and displaying an initial window.

In FIG. 8, lines 39 to 51, a program "window0( )", which is called by the program "FSample( )" or started as event processing, is described. This program "window0( )" is for displaying the first window "window0", in other words, the first window structure "W0". Here, the first window structure "W0" is assigned to the basic window and drawn, after deleting all window structures.

In FIG. 9, lines 56 to 68, a program "window1( )", which is started as event processing, is described. This program "window1( )" is for displaying the second window "window1", in other words, the second window structure "W1". Here, the second window structure "W1" is assigned to the basic window and drawn, after deleting all window structures.

In FIG. 9, lines 74 to 80, an event processing program for terminating the main program "main( )" is described.

In FIG. 9, lines 85 to 91, an event processing program for displaying the second window structure "W1" is described. This event processing program calls the program "window1( )", when a predetermined event is detected.

In FIG. 10, lines 95 to 101, an event processing program for displaying the first window structure "W0" is described. This event processing program calls the program "window0( )", when a predetermined event is detected.

In FIG. 10, lines 108 to 138, a class defining the first window structure "W0" is described. This class is called (instantiated) by the program "window0( )".

In FIG. 11, lines 142 to 173, a class defining the second window structure "W1" is described. This class is called (instantiated) by the program "window1( )".

FIG. 12 is a diagram showing an execution example of the program shown in FIGS. 8 to 11. Here, a situation where two windows of Window0 and Window1 are switched is shown. The window Window0 shown in the upper part of FIG. 12 is a window where the first window structure "W0" is displayed, while the window Window1 shown in the lower part is a window where the second window structure "W1" is displayed.

When this sample program is started, the window Window0 is displayed on the whole window. When a button "button for switching to window1" is clicked on the window Window0 the whole window is switched to the window Window1. Further, when a button "button for switching to window0" is clicked on the window Window1, the whole window is switched to the window Window0.

Note that this sample program corresponds to the block diagram of FIG. 1 as followings. That is, the basic window creation unit 51 corresponds to lines 24 to 31 in FIG. 8; the first window creation unit 52 corresponds to lines 43 to 44 in FIG. 8; the second window structure creation unit 53 corresponds to lines 60 to 61 in FIG. 9; the associating unit 54 corresponds to lines 45 to 46 in FIG. 8 and lines 62 to 63 in FIG. 9; the basic window 55a is defined at lines 26 to 31 in FIG. 8; the first window structure 55b is defined at lines 108 to 138 in FIG. 10; the second window structure 55c is defined at lines 142 to 173 in FIG. 11; the drawing unit 56 corresponds to lines 49 to 50 in FIG. 8, lines 66 to 67 in FIG. 9, and the like; and the drawing-event generation unit 57 corresponds to lines 49 to 50 in FIG. 8 and lines 66 to 67 in FIG. 9.

Thus, according to the window display system of the present embodiment, in the mufti-window display system, it is possible to switch window structures to be displayed on a single window, by selecting a target window structure from plural window structures. Thereby, even for an apparatus having a small-sized display or a small capacity memory, it is possible to realize a window display system in which plural window structures are switched to be displayed as a single window.

FIGS. 13 to 17 are lists of the second sample program which realizes the same functions as the first sample program shown in FIGS. 8 to 11. This second sample program differs from the first sample program in only inside structure, and an execution example of the second sample program is the same as the window displaying example shown in FIG. 12.

In FIG. 13, lines 15 to 18, a main program "main( )" is described.

In FIG. 13, lines 23 to 30, a program "Fsample2( )" which is called by the main program "main( )" is described. This program "Fsample2( )" is for creating the basic window and displaying an initial window.

In FIG. 13, lines 35 to 38, a program "window0( )" which is called by the program "Fsample2( )" is described. This program "window0( )" is for displaying the first window "window0", in other words, the first window structure.

From FIG. 14, line 44 to FIG. 15, line 95, a class "W0", which is called by the program "window0( )" or started as event processing, is described. This class displays the first window "window0", in other words, the first window structure (in FIG. 14, lines 54 to 82), and defines an event processing program for displaying the second window "window1", in other words, the second window structure (in FIG. 15, lines 87 to 93).

From FIG. 16, line 99 to FIG. 17, line 151, a class "W1" which is generated as event processing is described. This class displays the second window "window1", in other words, the second window structure (in FIG. 16, lines 109 to 139), and defines an event processing program for displaying the first window "window0", in other words, the first window structure (in FIG. 17, lines 144 to 150).

By such second sample program, the same functions as described for the first sample program are realized. That is, the execution example of the second sample program results in the window displaying example shown in FIG. 12. Therefore, by the second sample program, in the same manner as described for the first sample program, in the mufti-window display system, it is possible to realize a window display system in which a window structure displayed on a single window is switched to another, by selecting the target structure from plural window structures.

Although the window display system according to the present invention has been described based on the above embodiments, but the present invention is not limited to the description and the embodiments. Those skilled in the art will readily appreciate that various modifications are possible in the exemplary embodiments without materially departing from the novel teachings and advantages of the present invention. Accordingly, all such modifications are intended to be included within the scope of the present invention.

Note that if a window is created in the conventional window development systems (JBbuilder, for example), the window in which the basic window and the window structure in the present embodiment are integrated is created. Therefore, in order to create a window in which plural window structures are switched to be displayed on the one basic window as described in the window display system of the present invention, it is necessary to modify the programs or the like by manual handling. Furthermore, there are some window development systems which are not capable of such modification. Therefore, the present invention may be realized by adding such a conventional window development system with a function of creating the basic window and window structures, so that event processing is performed to switch the window structures to be displayed.

For example, the present invention is realized not only as the window display system described in the above embodiments, but also as a program (or window) development support device which creates the programs as shown in FIGS. 8 to 11 and FIGS. 13 to 17. In such a program development support device, parts in the programs shown in FIGS. 8 to 11, except parts which a user defines, are held as templates. Examples of the excluded parts defined by the user are the basic window, the plural window structures, the events to be detected when each window structure is being displayed, definition parts for window structures and the like to be switched when the events are detected, general event processing defined by the user, and the like. Then, only those user definitions are obtained from the user, and the obtained user definitions are incorporated into corresponding parts in the templates, thereby creating a source program, and an executable program and a window which are generated from the source program by compilation. The program or window created as above is an application program which has the same functions as described in the above embodiments, in other words, displays the plural window structures on a single window by switching these window structures.

Note also that the present invention can be also realized as a server device which provides services to client devices via communication paths, for example as a server device which transmits the window display system of the present embodiment, for example, the programs shown in FIGS. 8 to 11 and FIGS. 13 to 17, to client devices. Thereby, even if the client devices do not have the window display system of the present invention, the client devices can obtain the window display system of the present invention by downloading the program from the server device.

INDUSTRIAL APPLICABILITY

The present invention can be used as a window display system for displaying windows on a display such as a LCD, and especially as a window display system in apparatuses having small-capacity memory or apparatuses not having a hard disk and therefore not using virtual memory, such as a portable telephone or a portable information apparatus. Furthermore, if the present invention is applied to JAVA™ APPLET which operates in a browser of the Internet, a multiple-window display system can be constructed within the browser, so that a multiple-window display system having high security of JAVA™ APPLET can be easily constructed.

The invention claimed is:

1. A window display system which displays a window under management of a window management unit for managing plural windows as regions for display, each of the plural windows being composed of a single basic window and at least one window structure, said window display system comprising:
   a main memory;
   a basic window creation unit, stored on the main memory, that creates or obtains a single basic window as a region for display under management of the window management unit;
   a first window structure creation unit, stored on the main memory, that creates a first window structure, the first window structure being a first set of display elements to be displayed on the single basic window and data displayable on a single window under management of the window management unit;
   a second window structure creation unit, stored on the main memory, that creates a second window structure, the second window structure being a second set of display elements to be displayed on the single basic window and data displayable on a single window under management of the window management unit;
   an associating unit, stored on the main memory, that associates the single basic window with one of the first window structure and the second window structure;
   a graphic memory;
   a drawing unit, stored on the main memory, that draws (a) the single basic window and (b) the one of the first window structure and the second window structure by recording, onto the graphic memory as image data, the one of the first window structure and the second window structure together with the single basic window, the single basic window being associated with the one of the first window structure and the second window structure; and
   a drawing-event generation unit, stored on the main memory, that (i) generates a drawing-event which triggers said drawing unit to perform drawing or (ii) executes a command of causing said drawing unit to perform drawing, wherein said associating unit switches a window structure to be associated with the single basic window, from the first window structure to the second window structure, or from the second window structure to the first window structure, when a predetermined event is detected by the window management unit, wherein said drawing-event generation unit (i) generates the drawing-event which triggers said drawing unit to perform drawing or (ii) executes the command of causing said drawing unit to perform drawing, when said associating unit performs switching of the window structure to be associated with the single basic window, and wherein said drawing unit draws, on the single basic window, (a) the single basic window and (b) one of the first window structure switched to be associated with the single basic window and the second window structure switched to be associated with the single basic window, (i) after (i-1) said drawing-event generation unit generates the drawing-event which triggers said drawing unit to perform drawing, (i-2) the window management unit detects the drawing-event, and (i-3) adjustment for providing the drawing event to the single basic window is performed, or (ii) after said drawing-event generation unit executes the command of causing said drawing unit to perform drawing.

2. The window display system according to claim 1, wherein said drawing-event generation unit executes, as the drawing-event which triggers said drawing unit, window size change, window movement, change of overlapping window position, window visualization, invalidation of a window drawing area, or window color change.

3. The window display system according to claim 2, wherein said drawing-event generation unit further:
   holds, as predetermined window states, states of various kinds of windows;
   holds, as an obtained window state, a state of a target window which is the single basic window drawn by said drawing unit;
   selects, as a selected window state, one state from the predetermined window states;
   compares selected window state to the obtained window state;
   chooses another state from the predetermined window states, when the selected window state is identical to the obtained window state;
   chooses the selected window state, when the selected window state is different from the obtained window state; and
   sets the chosen state as a new window state of the target window, so that the target window generates the drawing-event, and said drawing unit draws, on the single basic window, the first window structure or the second window structure.

4. The window display system according to claim 3, wherein the predetermined window states include states of various windows having respective different window sizes.

5. The window display system according to claim 1, wherein said first window structure creation unit and said second window structure creation unit further obtain a pointer to a target window with which the first or second window structure is to be associated or the target window itself, and create the first or second window structure for the pointer or the target window.

6. The window display system according to claim 1, wherein, when said associating unit switches the first window structure to the second window structure, said associating unit deletes the first window structure and said second window structure creation unit creates the second window structure, and
   wherein when said associating unit switches the second window structure to the first window structure, said associating unit deletes the second window structure and said first window structure creation unit creates the first window structure.

7. The window display system according to claim 1, wherein said drawing unit includes a display screen, and wherein said drawing unit displays only one window on the display screen, and draws, as the only one window, a set of (i) the single basic window and (ii) the first window structure associated by said associating unit with the single basic window or the second window structure associated by said associating unit with the single basic window.

8. The window display system according to claim 1, wherein the event for changing the size of the single basic window by the predetermined number of pixels includes a changing of a window size by a number of pixels less than a few pixels, a difference in the changing of the window size being too small to be perceived by a human being.

9. A window display method of displaying a window under management of a window management unit for managing plural windows as regions for display, each of the plural windows being composed of a single basic window and at least one window structure, said window display method comprising:
   creating or obtaining, in a main memory of a window display system, a single basic window as a region for display under management of the window management unit;
   creating, in the main memory, a first window structure, the first window structure being a first set of display elements to be displayed on the single basic window and data displayable on a single window under management of the window management unit;
   creating, in a main memory, a second window structure, the second window structure being a second set of display elements to be displayed on the single basic window and data displayable on a single window under management of the window management unit;
   associating the single basic window with one of the first window structure and the second window structure;
   drawing (a) the single basic window and (b) the one of the first window structure and the second window structure by recording, onto a graphic memory as image data, the one of the first window structure and the second window structure together with the single basic window, the single basic window being associated with the one of the first window structure and the second window structure; and
   performing one of (i) generating a drawing-event which triggers said drawing and (ii) executing a command of causing said drawing, wherein in said associating, a window structure to be associated with the single basic window is switched from the first window structure to the second window structure, or from the second window structure to the first window structure, when a predetermined event is detected by the window management unit, wherein in said performing, (i) the drawing-event which triggers starting of said drawing is generated or (ii) the command of causing said drawing is executed, when the window structure to be associated with the single basic window is switched, and wherein said drawing includes drawing, on the single basic window, (a) the single basic window and (b) the one of the first window structure switched to be associated with the single basic window and the second window structure switched to be associated with the single basic window (i) after (i-1) the drawing-event is generated in said performing which triggers starting of said drawing, (i-2) the window management unit detects the drawing-event, and (i-3) adjustment for providing the drawing even to the single basis window is performed or (ii) after the command of causing said drawing to be executed in said executing.

10. The window display method according to claim 9, wherein said drawing includes displaying only one window on a display screen, and drawing, as the only one window, a set of (i) the single basic window and (ii) the first window structure associated in said associating with the single basic window or the second window structure associated in said associating with the single basic window.

11. The window display method according to claim 9, wherein the event for changing the size of the single basic window by the predetermined number of pixels includes a changing of a window size by a number of pixels less than a few pixels, a difference in the changing of the window size being too small to be perceived by a human being.

12. A non-transitory computer-readable storage medium having a program stored thereon that causes a computer to perform a window display method of displaying a window under management of a window management unit for managing plural windows as regions for display, each of the plural windows being composed of a single basic window and at least one window structure, the window display method comprising:

creating or obtaining, in a main memory, a single basic window as a region for display under management of the window management unit;

creating, in the main memory, a first window structure, the first window structure being a first set of display elements to be displayed on the single basic window and data displayable on a single window under management of the window management unit;

creating, in the main memory, a second window structure, the second window structure being a second set of display elements to be displayed on the single basic window and data displayable on a single window under management of the window management unit;

associating the single basic window with one of the first window structure and the second window structure;

drawing (a) the single basic window and (b) the one of the first window structure and the second window structure by recording, onto a graphic memory as image data, the one of the first window structure and the second window structure together with the single basic window, the single basic window being associated with the one of the first window structure and the second window structure; and performing one of (i) generating a drawing-event which triggers said drawing and (ii) executing a command of causing said drawing, wherein in said associating, a window structure to be associated with the single basic window is switched from the first window structure to the second window structure, or from the second window structure to the first window structure, when a predetermined event is detected, wherein in said performing (i), the drawing-event which triggers starting of said drawing is generated or (ii) the command of causing said drawing is executed, when the window structure to be associated with the single basic window is switched, and wherein said drawing includes drawing, on the single basic window, (a) the single basic window and (b) the one of the first window structure switched to be associated with the single basic window or the second window structure switched to be associated with the single basic window (i) after (i-1) the drawing-event is generated in said performing which triggers starting of said drawing, (i-2) the window management unit detects the drawing-event, and (i-3) adjustment for providing the drawing event to the single basic window is performed or (ii) after the command of causing said drawing to be executed in said executing.

* * * * *